(12) United States Patent
Belanger

(10) Patent No.: US 6,733,861 B1
(45) Date of Patent: *May 11, 2004

(54) VEHICLE LAUNDRY ELEMENT AND METHOD OF MAKING SAME

(75) Inventor: Michael J. Belanger, Novi, MI (US)

(73) Assignee: Belanger, Inc., Northville, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1079 days.

(21) Appl. No.: 08/820,506

(22) Filed: Apr. 4, 1997

(51) Int. Cl.[7] .............................................. B32B 5/12
(52) U.S. Cl. .................. 428/114; 428/192; 428/193; 442/326; 442/388; 442/389; 15/97.3
(58) Field of Search ................................ 428/114, 192, 428/193; 442/326, 388, 389, 402, 403; 15/97.3

(56) References Cited

U.S. PATENT DOCUMENTS

| | | |
|---|---|---|
| 2,959,509 A | 11/1960 | Marshall ..................... 154/101 |
| 3,705,064 A * | 12/1972 | Lochner |
| 3,725,166 A | 4/1973 | McCord |
| 3,725,186 A * | 4/1973 | McCord |
| 4,088,520 A | 5/1978 | Suominen ................... 156/73.6 |
| 4,154,889 A | 5/1979 | Platt ........................... 428/234 |
| 4,199,644 A | 4/1980 | Platt ........................... 428/300 |
| 4,342,802 A | 8/1982 | Pickens, Jr. et al. .......... 428/92 |
| 4,377,878 A * | 3/1983 | Pecora ....................... 15/97 B |
| 4,416,936 A | 11/1983 | Erickson et al. ............ 428/286 |
| 4,582,750 A | 4/1986 | Lou et al. ................... 428/288 |
| 5,003,674 A | 4/1991 | Cohen et al. ................ 28/109 |
| 5,329,680 A | 7/1994 | Manne ......................... 28/107 |
| 5,380,574 A | 1/1995 | Katoh et al. ................. 428/92 |
| 5,784,748 A * | 7/1998 | Belanger et al. ............. 15/97.3 |

* cited by examiner

Primary Examiner—Elizabeth M. Cole
(74) Attorney, Agent, or Firm—Young & Basile P.C.

(57) ABSTRACT

A vehicle carwash element of the type which contacts the vehicle made by needle-punching three layers of synthetic strand material such as polyester, polypropylene or other polymeric strands. The quantities of material are arranged in layers with similar colors on the outside and a contrasting color on the inside. The layers are then needle punched to physically integrate them to the point of producing a unitary sheet-like body but insufficiently to totally blend the colors such that a center stripe of contrasting color appears on the edges of the resulting body and on any smaller body which is cut from the sheet which is manufactured according to the process described above.

5 Claims, 2 Drawing Sheets

VEHICLE LAUNDRY ELEMENT AND METHOD OF MAKING SAME

FIELD OF THE INVENTION

This invention pertains to vehicle-surface-contacting elements, such as non-woven synthetic cloth shapes used in vehicle laundry implements such as brushes and mitter curtains and more particularly, to a brush element having certain desired appearance characteristics and to a method of making same.

BACKGROUND OF THE INVENTION

It is common to use synthetic felt shapes as the vehicle-surface-contacting components of vehicle laundry implements such as brushes and mitter curtains. These elements are made of non-woven, fibrous, sheet-like material generally manufactured by needle punching to integrate quantities of randomly arranged strands of synthetic fibers such as polyester and polypropylene. Brush and mitter curtain elements made of these materials are believed to be essentially non-damaging to the bright metal and painted surfaces of the vehicle and are widely used in modern day carwash systems.

While manufacturers generally endeavor to provide the best possible mechanical systems for use in carwashes and the like, they have no direct control over the quality of the vehicle contacting elements which are used in and in combination with their mechanical components, particularly as replacement parts. Since the cloth elements wear out fairly rapidly as a result of repeated contact with vehicle surfaces and since after-market replacements vary substantially in quality and physical characteristics, it is desirable for the equipment manufacturer who, out of concern for its reputation, to be able to readily determine whether the cloth elements which it manufactures or recommends for use in its equipment are actually being used by owners in the field.

Because typical cloth elements are blue in color and typically all look essentially the same, it is not possible to readily determine the manufacturing origin of replacement cloth elements used in carwash equipment without obtaining a sample of the element and subjecting it to substantial testing and/or close inspection.

SUMMARY OF THE INVENTION

The present invention provides a vehicle surface contacting element for use in a vehicle laundry implement such as a brush or a mitter curtain which is of distinctive character and appearance and which is readily Identifiable as one which originates with a particular manufacturer.

In general, this is achieved by providing a vehicle contacting element in the form of a sheet-like body of fibrous material having at least two substantially physically integrated layers of visually distinct colors which layers, although physically integrated to the point where the sheet is essentially unitary, remain sufficiently visually distinct as to be readily identified by mere inspection.

In the preferred form, the element comprises three color layers, the outer layers being of one color and the intermediate layer being of another color such that the body appears to have an edge stripe of distinctive appearance.

Another aspect of the invention is the method of manufacturing an element of the type described above. In general, the manufacturing method comprises the steps of providing at least first and second quantities of non-woven fibrous material such as polyester, polypropylene or combinations of same and integrating the masses of material sufficiently to produce a sheet-like body of unitary character but which retains visually distinctive layers of different color which can be readily identified.

In the preferred form, the method of manufacturing is such as to provide a sheet material of which the opposite outer layers are of similar or identical color and the intermediate layer is of a contrasting color so that shapes cut from the sheet exhibit an edge stripe of the contrasting color. So manufactured, the cut shape appears to be of uniform color when viewed from front or back but displays the visually distinctive edge stripe of contrasting color which can be used to readily identify the element as one originating from a particular source. The denier of the fibers used for the intermediate layer may be smaller than that of the outer layers in a three-layer body.

DETAILED DESCRIPTION OF THE ILLUSTRATIVE EMBODIMENT

Figure 1:
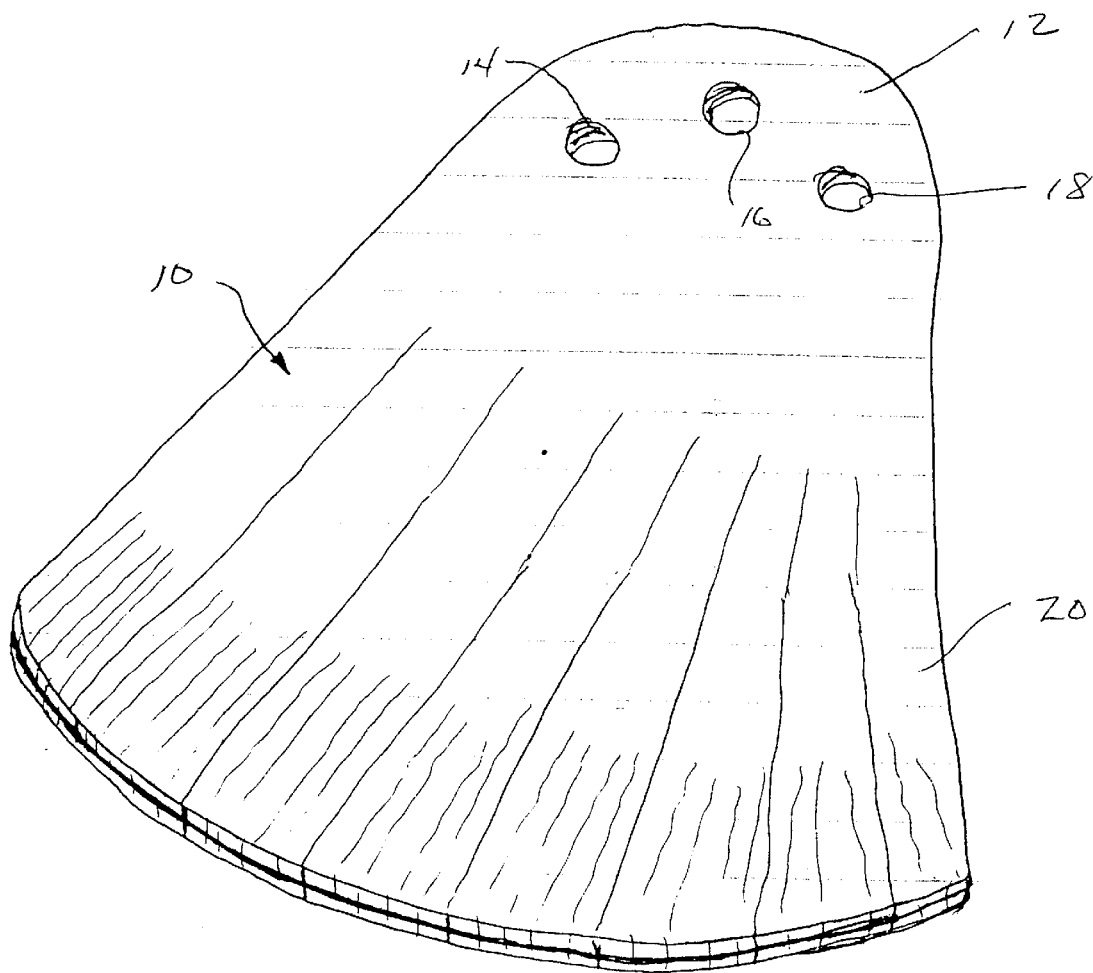
FIG. 1 is a perspective view of a vehicle-surface-contacting element for use in a car-washing implement such as a rotating side or top brush.

Referring to FIG. 1 there is shown a fan-shaped vehicle laundry element in the form of a sheet-like body 10 of fibrous non-woven material such as polyester, propylene and/or other synthetic polymeric materials and/or combinations of same. The particular element shown in FIG. 1 is designed for use in combination with other elements of the same shape in constructing a vehicle laundry brush of the type set forth in the co-pending application for patent, Ser. No. 08/641,024 "Vehicle Laundry Brush and Replaceable Cloth Elements for Use Therewith", filed Apr. 29, 1996 and assigned to Belanger, Inc. of Northville, Mich. In this example, the body 10 includes an attachment portion 12 having three holes 14, 16 and 18 die cut therein so that the body 10 may be attached to the brush structure. The opposite, larger end of the body 10 is die cut with long parallel longitudinal slits to form large fingers 20 which are further divided into shorter sub-fingers approximately ⅜ inch wide.

The configuration of the body 10 shown in FIG. 1 is, of course, merely illustrative; i.e., various elements and various shapes may be constructed using the material of the present invention to accommodate the particular desires of the equipment manufacturer or operator. As is well known, strip-like elements are used with mitter curtains and shorter, rectangular or fan-shaped or even circular elements are best used with rotating brushes.

Figure 2:
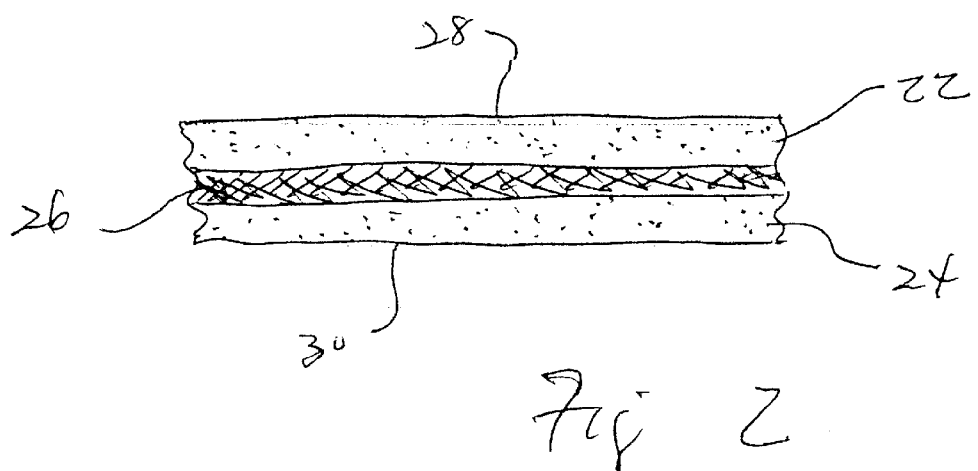
FIG. 2 is an enlarged edge view of a portion of the element of FIG. 1.

As shown in both FIGS. 1 and 2, it can be seen that the element 10 comprises three visually distinct layers; namely, outer layers 22 and 24 of a first color, such as blue, and an intermediate or central layer 26 of a second color, such as yellow, which contrasts with the first color and is readily identified relative thereto. The thicknesses of the layers appear to be approximately the same in this particular illustration and the overall thickness of the body is on the order of ⅛ of an inch.

The body 10 of FIG. 1 is manufactured using a needle-punching operation generally of the type described in one or more of the following United States Patents: Manne, U.S. Pat. No. 5,329,680; Eridkson, U.S. Pat. No. 4,416,936;

Cohen, U.S. Pat. No. 5,003,674; and Lou et al., U.S. Pat. No. 4,582,750. However, whereas one or more of those patents describes a needle-punch operation in which randomly arranged synthetic non-woven fibrous materials are integrated to produce blended or "heathered" colors, the present invention contemplates the needle-punching operation of lesser extent which is carried out sufficiently to physically integrate the materials hereinafter described so as to create the appearance and function of a unitary sheet-like body, but terminated at such time as to preserve the visual distinctiveness of the different layers of different colors. Thus, the process results in a sheet-like material from which desired shapes may be cut and all of these shapes will exhibit an edge stripe (26) of contrasting color.

Assuming the process is directed toward the manufacture of the body 10 shown in FIGS. 1 and 2, the first step is to provide first and second quantities of non-woven fibrous material such as polyester and a third quantity of similar material but of contrasting color and, preferably, of lesser denier. For example, quantities of material sufficient to produce the outer layers 22 and 24 of the body 10 shown in FIG. 2 are provided of a No. 4 denier blue polyester material and a similar quantity of No. 2 denier yellow fibrous material is physically placed between the first and second quantities which ultimately constitute the outer layers 22 and 24. Polyester produces a high quality material and it is to be understood that less expensive materials such as polypropylene may also be used; i.e., the invention is not restricted to any given material whether or not listed herein. The materials are then needle punched sufficiently to physically integrate all three layers into a unitary sheet of uniform thickness wherein the opposed surfaces 28 and 30 shown in FIG. 2 are of the same blue color, but the intermediate layer 26 shows as a yellow stripe on the edge of the body as is more completely shown in FIG. 1. The body 10, thereafter cut from material 56 fabricated has the outwardly physical appearance of a standard element while, at the same time, the manufacturer of it can readily identify it and distinguish it from non-proprietary or non OEM elements by visual detection of the edge stripe produced by the intermediate layer 26.

Of course, elements of only two layers can also be manufactured in which case the opposing surfaces would be of different colors. In addition, four or more layers may also be integrated thus to produce a multi-colored stripe.

Elements 10 of the type described herein and/or manufactured in accordance with the process described herein may be particularly desirable for use in vehicle laundries associated with the retail outlets of a particular petroleum company whose trademarks and logos have distinctive colors.

Obviously, the particular elements 10 are die cut from larger sheets of material manufactured according to the process described above. As necessary, the die cut bodies are then folded and riveted or stitched to produce the desired shape, either multi-planar as shown in FIG. 1 or planar for use in other types of equipment.

I claim:

1. A three layer, pliable, sheet-like vehicle laundry element in which the two outer layers are of one color and the intermediate layer is of a second contrasting color made according to the process which comprises the steps of:

(a) providing a first quantity of non-woven synthetic strands of said first color;

(b) providing a second quantity of non-woven synthetic strands of said second color;

(c) providing a third quantity of non-woven synthetic strands of said first color;

(d) needle punching the three quantities for a sufficient time to physically, non-adhesively integrate them into a sheet-like body in which the colors of the intermediate layers remains visually readily identifiable; and (e) cutting the resulting sheet-like body into the desired shape of the vehicle laundry element to expose the distinct color of the intermediate layer as an edge stripe.

2. A multipale layer, pliable, sheet-like carwash brush body comprising at least first and second layers of contrasting colors which are non-adhesively integrated by needle punching to create an essentially unitary structure while preserving the distinct colors of said layers;

said body having at least one attachment structure formed therein.

3. Apparatus as defined in claim 2 wherein said body is partially divided into a plurality of parallel strip-like fingers extending to at least one edge surface thereof.

4. An elongate pliable sheet-like carwash element comprising front and back surface layers of a first blended color and an intermediate layer of a second essentially unblended color which contrasts visually with the first blended color, said intermediate layer extending to and being visible at and along the peripheral edges of said element; and attachment means being formed in said element adjacent one end thereof.

5. The element defined in claim 4 wherein all of the layers are composed of non-woven synthetic filaments which are physically integrated with one another by needle punching therethrough, the denier of the intermediate layer being smaller than that of the surface layers.

* * * * *